(12) United States Patent
Alcove Clave et al.

(10) Patent No.: US 11,980,868 B2
(45) Date of Patent: May 14, 2024

(54) METHOD FOR THE TREATMENT OF AN EXHAUST GAS AND AN HVAC SYSTEM

(71) Applicant: Johnson Matthey Public Limited Company, London (GB)

(72) Inventors: Silvia Alcove Clave, Reading (GB); Kevin Doura, Audubon, PA (US); Joseph Fedeyko, Wayne, PA (US)

(73) Assignee: JOHNSON MATTHEY PUBLIC LIMITED COMPANY, London (GB)

( * ) Notice: Subject to any disclaimer, the term of this patent is extended or adjusted under 35 U.S.C. 154(b) by 0 days.

(21) Appl. No.: 17/820,012

(22) Filed: Aug. 16, 2022

(65) Prior Publication Data

US 2023/0074001 A1 Mar. 9, 2023

Related U.S. Application Data

(60) Provisional application No. 63/260,652, filed on Aug. 27, 2021.

(51) Int. Cl.
*B01J 21/02* (2006.01)
*B01D 53/86* (2006.01)
*B01J 21/10* (2006.01)
*B01J 23/00* (2006.01)
*B01J 23/02* (2006.01)
*B01J 23/10* (2006.01)
*B01J 23/34* (2006.01)
*B01J 23/72* (2006.01)
(Continued)

(52) U.S. Cl.
CPC .......... *B01J 23/002* (2013.01); *B01D 53/864* (2013.01); *B01D 53/8687* (2013.01); *B01J 21/02* (2013.01); *B01J 23/72* (2013.01); *B01J 23/78* (2013.01); *B01J 23/83* (2013.01); *B01J 23/8892* (2013.01); *F24F 8/167* (2021.01); *F24F 8/95* (2021.01); *B01D 2255/40* (2013.01); *B01D 2257/502* (2013.01); *B01D 2257/708* (2013.01); *B01D 2258/06* (2013.01); *B01D 2259/4508* (2013.01); *B01J 2523/17* (2013.01); *B01J 2523/22* (2013.01); *B01J 2523/31* (2013.01); *B01J 2523/3706* (2013.01); *B01J 2523/72* (2013.01)

(58) Field of Classification Search
CPC . B01J 21/02; B01J 21/10; B01J 23/002; B01J 23/02; B01J 23/10; B01J 23/34; B01J 23/72; B01J 23/78; B01J 23/83; B01J 23/8892; F24F 8/95; F24F 8/167; B01D 53/864; B01D 53/8687
See application file for complete search history.

(56) References Cited

U.S. PATENT DOCUMENTS 5,502,019 A * 3/1996 Augustine ................ B01J 23/75
502/313
5,691,268 A * 11/1997 Koveal ..................... B01J 23/83
502/343

(Continued)

FOREIGN PATENT DOCUMENTS

WO 2010/123731 A1 10/2010

*Primary Examiner* — Cam N. Nguyen
(74) *Attorney, Agent, or Firm* — BakerHostetler

(57) ABSTRACT

The present invention relates to a method for the treatment of an exhaust gas comprising carbon monoxide (CO) and/or one or more volatile organic compounds (VOCs) using a PGM-free catalyst article comprising a mixed oxide of Mn, Cu, Mg, Al and La. The present invention also relates to an HVAC system comprising a PGM-free catalyst article.

11 Claims, 10 Drawing Sheets

Figure 1A:
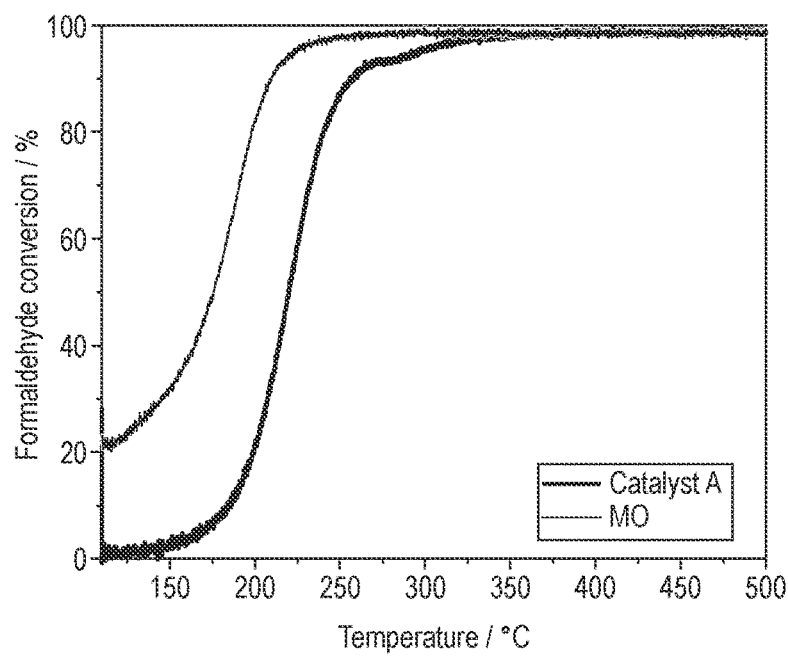

(51) Int. Cl.
*B01J 23/78* (2006.01)
*B01J 23/83* (2006.01)
*B01J 23/88* (2006.01)
*B01J 23/889* (2006.01)
*F24F 8/167* (2021.01)
*F24F 8/95* (2021.01)

(56) References Cited

U.S. PATENT DOCUMENTS

| | | | |
|---|---|---|---|
| 5,882,616 A | | 3/1999 | Ziebarth et al. |
| 6,489,264 B1 | * | 12/2002 | Isupova .................... B01J 23/78 |
| | | | 502/313 |
| 8,022,264 B2 | * | 9/2011 | Hatscher ................ B01D 53/02 |
| | | | 585/824 |
| 8,236,264 B2 | * | 8/2012 | Hatscher ................ B01J 23/80 |
| | | | 423/247 |
| 9,409,779 B2 | * | 8/2016 | Buchholz ................ D01F 9/127 |
| 11,291,976 B2 | * | 4/2022 | Leonard ............... B01J 35/1061 |
| 2014/0255284 A1 | | 9/2014 | Alden et al. |
| 2021/0001311 A1 | * | 1/2021 | Wu .......................... B01J 37/18 |
| 2021/0031176 A1 | * | 2/2021 | Suriye ................... B01J 29/166 |

\* cited by examiner

METHOD FOR THE TREATMENT OF AN EXHAUST GAS AND AN HVAC SYSTEM

The present invention relates to a method for the treatment of an exhaust gas, in particular, an exhaust gas comprising carbon monoxide (CO) and/or one or more volatile organic compounds (VOCs) using a PGM-free catalyst article. The present invention also relates to an HVAC system comprising a PGM-free catalyst article.

It is well known that catalysts comprising platinum group metals (PGMs) may be used for the catalytic oxidation of harmful emissions such as CO and VOCs. PGM catalysts are ubiquitous in catalysts for the treatment of car exhaust emissions as well as emissions from industrial processes. PGM catalysts possess high catalytic activity and good thermal stability. However, PGMs are expensive and there is a desire to reduce the cost of catalyst articles without loss in catalytic activity. This is particularly true for industrial processes, such as in the catalytic oxidation of the tail-gas in terephthalic acid synthesis, and other systems which are used to treat large volumes of exhaust gas, such as HVAC systems, which would require a significant investment in the expensive PGM.

PGM-free catalysts comprising base metals have been known as alternatives to PGM catalysts. Base metals are significantly cheaper, however, there remains a need for such catalysts to demonstrate high catalytic activity so as to provide improved CO and VOCs oxidation activity.

WO 03/101612 relates to a catalyst composition for treating emissions from industrial and commercial processes and processes for the generation of power from hydrocarbon fuels such as coal, oil and gas. In particular the invention relates to a catalyst composition for oxidising carbon monoxide (CO) and volatile organic compounds (VOCs) and in one aspect, provides a catalyst composition for use as a hydrogenation catalyst, which composition comprising at least two different high surface area oxide support materials wherein at least one of the high surface area support material supports at least one base metal promoter.

WO 2010/123731 relates to copper and manganese containing base metal catalysts for the oxidation of carbon monoxide and volatile organic compounds. The catalyst composition comprises at least one base metal promoter and at least one base metal catalyst supported on an oxide support material comprising one or more of alumina, silica, zirconia, ceria, and titania, for example, lanthanum stabilised alumina and/or zirconium stabilised ceria.

WO 2014/138397 relates to a base metal catalyst and method of using the same, in particular, a catalyst comprising a first base metal catalyst in contact with an oxygen donating support that is substantially free of alumina, and at least one second base metal catalyst. In some embodiments, the catalyst comprises from 10-20 wt % CuO, and the catalyst comprises from 5-10 wt % MnO.

The inventors developed the present invention with the aim of overcoming the problems associated with the prior art and to provide an improved method for the treatment of an exhaust gas comprising CO and/or one or more VOCs, or to at least provide a commercially useful alternative.

Thus in a first aspect of the present invention there is provided a method for the treatment of an exhaust gas comprising one or more volatile organic compounds (VOCs), the method comprising, contacting the exhaust gas with a PGM-free catalyst article comprising a mixed oxide of Mn, Cu, Mg, Al and La.

The present disclosure will now be described further. In the following passages, different aspects/embodiments of the disclosure are defined in more detail. Each aspect/embodiment so defined may be combined with any other aspect/embodiment or aspects/embodiments unless clearly indicated to the contrary. In particular, any feature indicated as being preferred or advantageous may be combined with any other feature or features indicated as being preferred or advantageous.

The method of the present invention relates to a method for the treatment of an exhaust gas. The exhaust gas comprises carbon monoxide and/or one or more volatile organic compounds. In one embodiment, the exhaust gas comprises CO and one or more VOCs.

VOCs are defined by the WHO, as cited in ISO 16000-6, as any organic compound whose boiling point is in the range from (50° C. to 100° C.) to (240° C. to 260° C.), corresponding to having saturation vapour pressures at 25° C. greater than 102 kPa. VOCs include alcohols, aldehydes, amines, esters, ethers, hydrocarbons (up to about C10), ketones, nitrogen-containing compounds, phenols, indoles and other aromatic compounds, terpens and sulphur containing compounds.

The method comprises contacting the exhaust gas with a PGM-free catalyst article comprising a mixed oxide of manganese (Mn), copper (Cu), magnesium (Mg), aluminium (Al) and lanthanum (La). Platinum groups metals (PGMs) are a known class of noble metals which refers to the group consisting of ruthenium (Ru), rhodium (Rh), palladium (Pd), osmium (Os), iridium (Jr), and platinum (Pt). Thus, the mixed metal oxide does not comprise any PGM (e.g. as a metal or as an oxide or salt). As will be appreciated, the metals of the mixed metal oxide (i.e. Mn, Cu, Mg, Al and La) are all present as an oxide as opposed to being in a metallic state.

The inventors have found that a mixed metal oxide comprising Mn, Cu, Mg, Al and La provides a particularly effective PGM-free catalyst for the catalytic oxidation of CO and VOCs. Such an oxide has been found to provide improved activity, even at relatively low temperatures. The inventors have found the catalyst to be particularly effective for the catalytic oxidation of methanol, ethanol, acetaldehyde, formaldehyde, propene (propylene) and ethene (ethylene). Accordingly, it is preferred that the VOCs comprise one or more compounds selected from methanol, ethanol, acetaldehyde, formaldehyde, propene and ethylene.

Preferably, the exhaust gas is from a heating, ventilation, and air condition system (an HVAC system) or is a tail-gas from a chemical synthesis process, preferably terephthalic acid synthesis. That is, the exhaust gas may be the tail-gas of a process for producing purified terephthalic acid (PTA). PTA plants emit CO and a variety of VOCs, such as methyl bromide, benzene, acetates, xylenes, acetic acid and methanol. Together they cause smog; methyl bromide is also a stratospheric ozone depleter.

In a commercial process for producing PTA, terephthalic acid may be produced by oxidation of p-xylene by oxygen using acetic acid as a solvent. This may occur in the presence of a catalyst such as cobalt-manganese using a bromide promoter. The product may be purified by hydrogenation while in a water solution and may then be cooled. The tail-gas in a purified terephthalic acid (PTA) process may comprise oxygen, nitrogen, nitrogen oxides, methyl bromide, benzene, methane, carbon monoxide, methyl acetate, and water. Specifically, a typical PTA process tail-gas may include 30 parts per million (ppm) methyl bromide, 10 ppm benzene, 100 ppm methane, 1000 ppm carbon monoxide, 500 ppm methyl acetate, 1.5 mol % water, 4 mol % oxygen, and the balance nitrogen. In addition, the mixed metal oxide may also oxidize and convert other volatile organic compounds such as methyl ethyl ketone, methanol, butane, or butene.

PTA process tail-gases may also comprise about 2 mol % steam/water. Similarly, HVAC systems may be required to treatment gas comprising water/moisture. The mixed oxide must be stable and able effectively to function in an environment with moisture. Certain catalysts and supports, such as zeolites, are known to degrade under hydrothermal conditions, especially over a period of time. The mixed metal oxide described herein however is able to withstand and work effectively in a gas containing water vapour, for example 1.5 mol % to 5 mol % moisture at a temperature of greater than 400° C., or alternatively, 200° C. to 400° C., 200° C. to 325° C., 200° C. to 300° C., 200° C. to 250° C., or alternatively less than 325° C., less than 300° C., or less than 250° C.

When the gas, such as a tail-gas from a PTA process, containing water vapour, CO, and VOCs is contacted with the mixed metal oxide, the CO and VOCs are oxidized. For example, where a process effluent gas comprises water vapour, CO and methyl bromide, the process effluent may be preheated and passed through a catalyst bed in the presence of excess oxygen and the polluting components in the stream are oxidized to carbon dioxide ($CO_2$) and hydrogen bromide (HBr). Hydrogen bromide from downstream of the catalyst can be easily removed from the effluent by passing the gas through a caustic scrubber, thus removing the pollutants from effluent before emitting the exhaust to the atmosphere.

The oxide (which may be referred to herein as the mixed metal oxide or mixed oxide) is preferably not supported on a mixed oxide support such as La, Al, Zr or Ce mixed oxides. Instead, some of these oxides, specifically those of Al and La, are incorporated into the lattice structure of the mixed metal oxide described herein. The mixed metal oxide may therefore be represented by a single formula, e.g. $Mn_aCu_bMg_cAl_dLa_eO_f$ (wherein a, b, c, d, e and f are the molar amounts of the elements).

The inventors have found that the mixed metal oxide is particularly effective where the Mn and La contents are greater. Preferably, the mixed oxide comprises at least 30 wt % Mn on a metal-only basis. More preferably, the mixed oxide comprises at least 35 wt % and even more preferably at least 40 wt % Mn. The amount of Mn is at most 60 wt %, more preferably at most 55 wt %, and even more preferably at most 50 wt %.

Preferably, the mixed oxide comprises at least 35 wt % La and/or at most 45 wt % La, preferably at least 39 wt % La and/or at most 43 wt % La.

All weight percentages described herein (i.e. wt %) with respect to the metals of the mixed metal oxide are provided on a metal-only basis. That is, the wt % of a given metal is provided as a percentage by weight of the total amount of metals in the mixed metal oxide, thereby excluding the weight provided by the oxygen (O).

Similarly, the inventors have found that it is preferred that copper is present in an amount of at least 5 wt %. Preferably, the amount of copper is at most 10 wt %.

For example, the inventors have found that, in particular, a mixed metal oxide which comprises from 40 to 50 wt % Mn and at least 5 wt % copper, is a preferred combination of Mn and Cu.

Furthermore, the inventors have found that, preferably, the mixed oxide comprises at least 3 wt % Mg and/or at most 6 wt % Mg. Preferably, the mixed oxide comprises at least 1 wt % Al and/or at most 3 wt % Al.

Consequently, in a particularly preferred embodiment, the mixed oxide comprises, on a metal-only basis:
40 to 50 wt % Mn;
6 to 8 wt % Cu;
3 to 6 wt % Mg;
1 to 3 wt % Al;
35 to 45 wt % La.

Even more preferably, the mixed oxide comprises, on a metal-only basis:
42 to 48 wt % Mn;
about 7 wt % Cu;
about 4.5 wt % Mg;
about 2 wt % Al;
39 to 43 wt % La.

Preferably, the term "about" refers to within ±10%, more preferably within ±5% whilst simultaneously disclosing the value itself within experimental error. Accordingly, the mixed oxide preferably comprises at least 6.3 wt % Cu and/or at most 7.7 wt % Cu, such as from 6.3 wt % to 7 wt %, 7 wt % to 7.7 wt % or 6.3 wt % to 7.7 wt %. Equally, the mixed oxide preferably comprises at least 4.05 wt % Mg and/or at most 4.95 wt % Mg, such as from 4.05 wt % to 4.5 wt %, 4.5 wt % to 4.95 wt % or 4.05 wt % to 4.95 wt %. Preferably, the mixed oxide preferably comprises at least 1.8 wt % Al and/or at most 2.2 wt % Al, such as from 1.8 wt % to 2 wt %, 2 wt % to 2.2 wt % or 1.8 wt % to 2.2 wt %. The same applies equally for the preferred range of ±5%.

In a preferred embodiment, the mixed oxide consists essentially of Mn, Cu, Mg, Al and La, and oxygen (O). That is, the mixed metal oxide may be represented by a single formula, e.g. $Mn_aCu_bMg_cAl_dLa_eO_f$ (wherein a, b, c, d, e and f are the molar amounts of the elements). Equally, the sum of the weight percentages of the metals Mn, Cu, Mg, Al and La will essentially equal 100 wt %.

It is preferred that the molar ratio of Mn to La is at least 2.5:1 and/or at most 3:1. For example, the molar ratio of Mn to La is preferably from 2.5:1 to 3:1. In other words, the ratio a:e is from 2.5:1 to 3:1. It is preferred that the Mn to Al ratio is at least 10:1 and/or at most 12:1, e.g. the ratio a:d is from 10:1 to 12:1. It is preferred that the Mn to Mg ratio is at least 4:1 and/or at most 5:1, e.g. the ratio a:c is from 4:1 to 5:1. It is preferred that the Mn to Cu ratio is at least 7:1 and/or at most 7.5:1, e.g. the ratio a:b is from 7:1 to 7.5 to 1.

In a further aspect of the present invention, there is provided an HVAC system comprising a PGM-free catalyst article comprising a mixed oxide of Mn, Cu, Mg, Al and La.

Preferably, the mixed oxide of Mn, Cu, Mg, Al and La is that described herein with respect to the method for the treatment of an exhaust gas. For example, it is preferred that the mixed oxide comprises, on a metal-only basis:
40 to 50 wt % Mn;
6 to 8 wt % Cu;
3 to 6 wt % Mg;
1 to 3 wt % Al;
35 to 45 wt % La.

The inventors have found that the mixed metal oxide comprising Mn, Cu, Mg, Al and La shows greater VOC oxidation activity together with selectivity to $CO_2$. Consequently, the oxide is particularly effective at removing harmful VOC pollutants from air in HVAC systems for providing purified indoor air. In particular, the mixed metal oxide is particularly effective as an oxidation catalyst at relatively low temperatures and is therefore particularly suited for such low temperature applications.

In the following Catalyst A is a comparison catalyst, whereas Catalyst MO is an example in accordance with the invention.

FIGURES

Figure 1B:
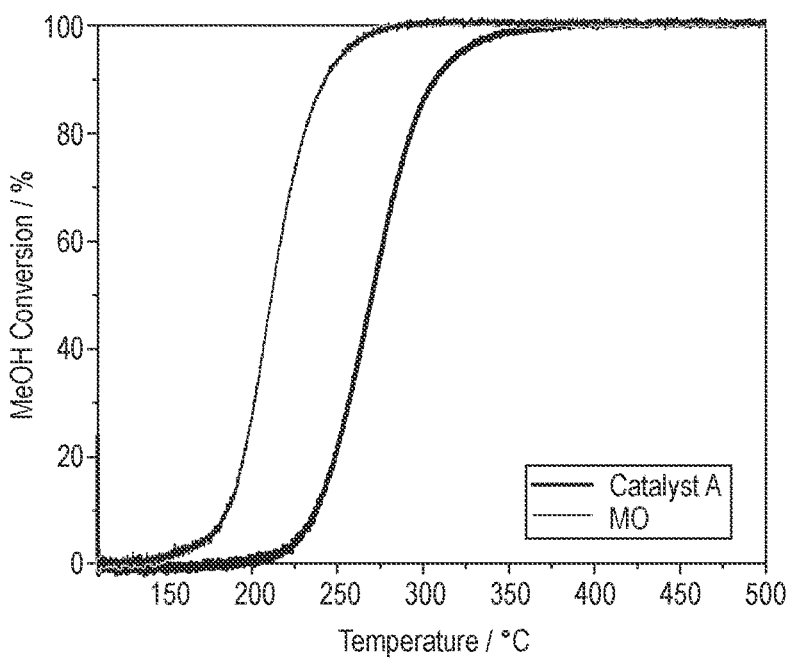

The present invention will now be described further with reference to the following non-limiting Figures in which:

FIGS. 1A and 1B provide the results of Example 1 and plot the conversion of formaldehyde and methanol, respectively, against temperature under gas engine test conditions for Catalyst MO together with a known comparison base metal catalyst, Catalyst A.

Figure 2A:
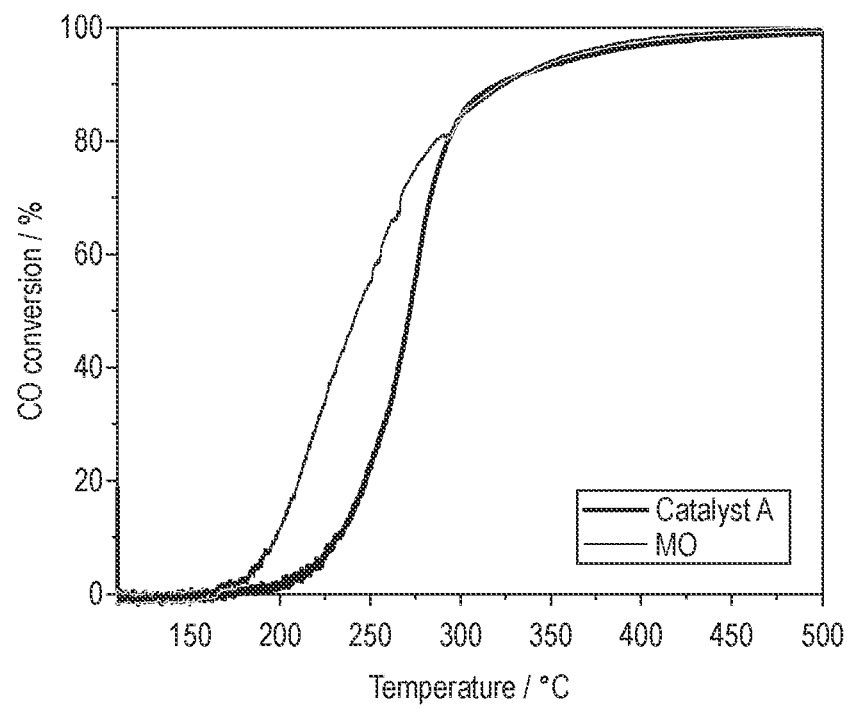
Figure 2B:
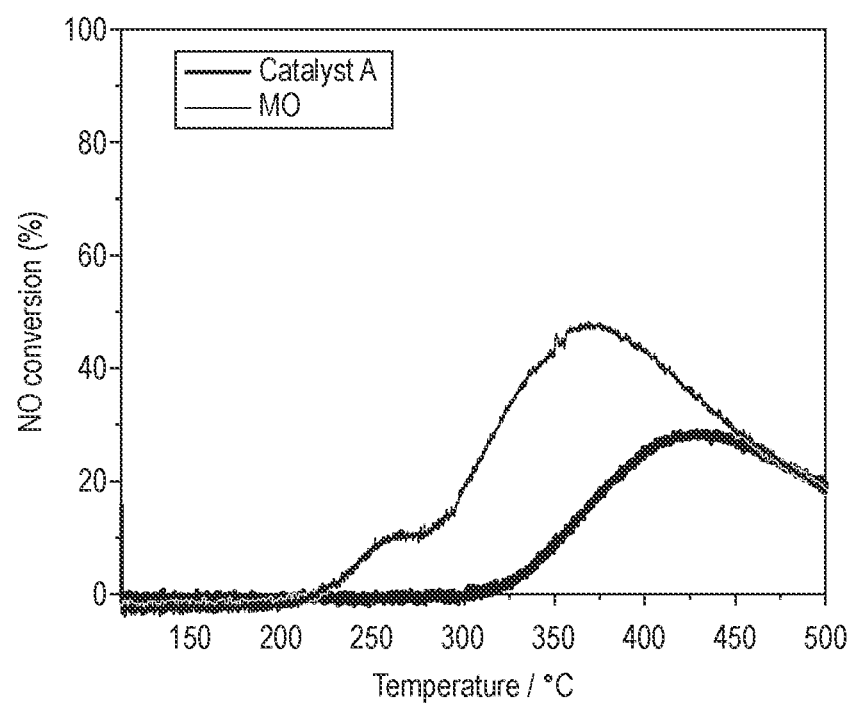

FIGS. 2A and 2B provide the results of Example 2 and plot the conversion of CO and NO, respectively, against temperature under gas engine test conditions for both Catalyst MO together with Catalyst A.

Figure 3A:
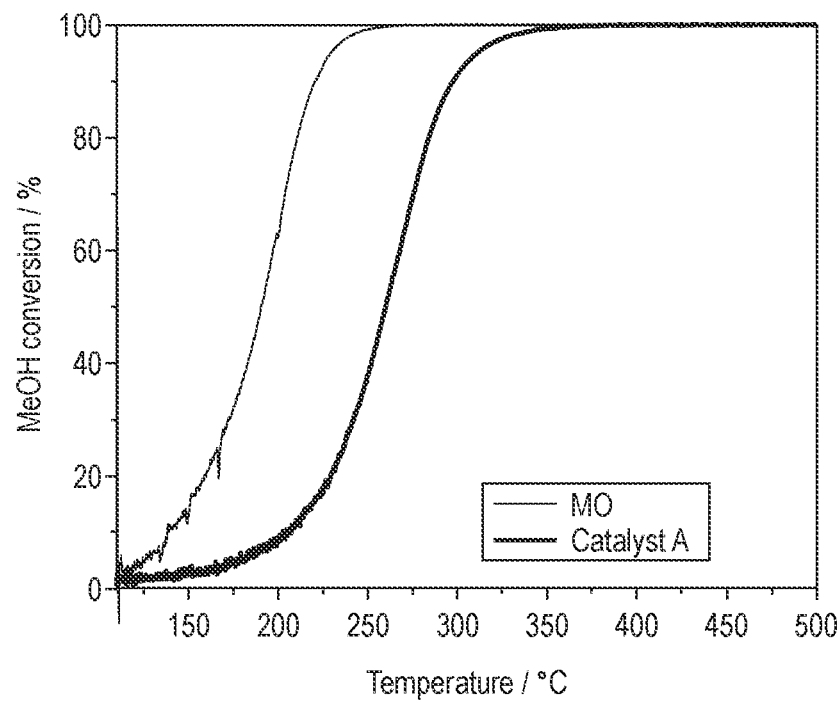
Figure 3B:
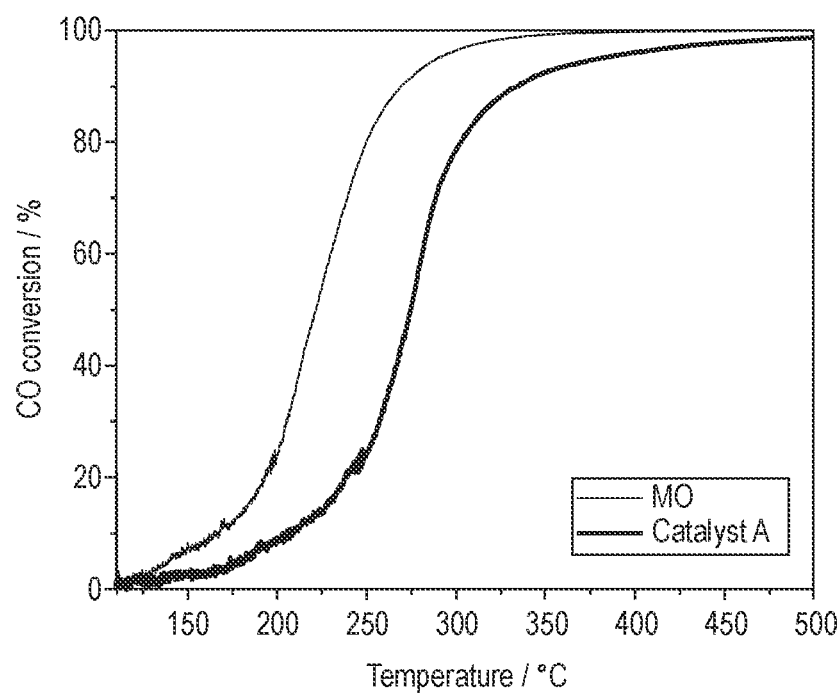
Figure 3C:
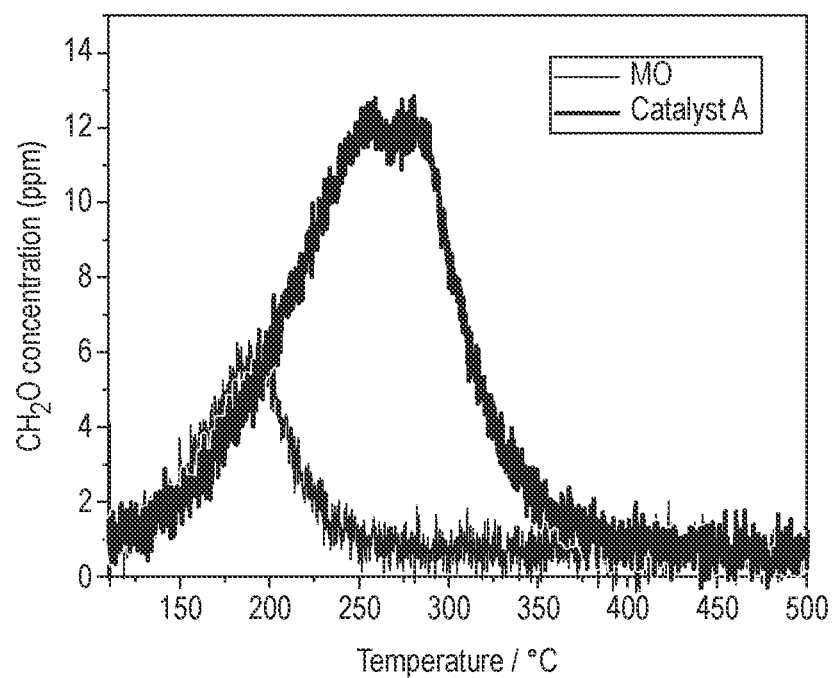
Figure 3D:
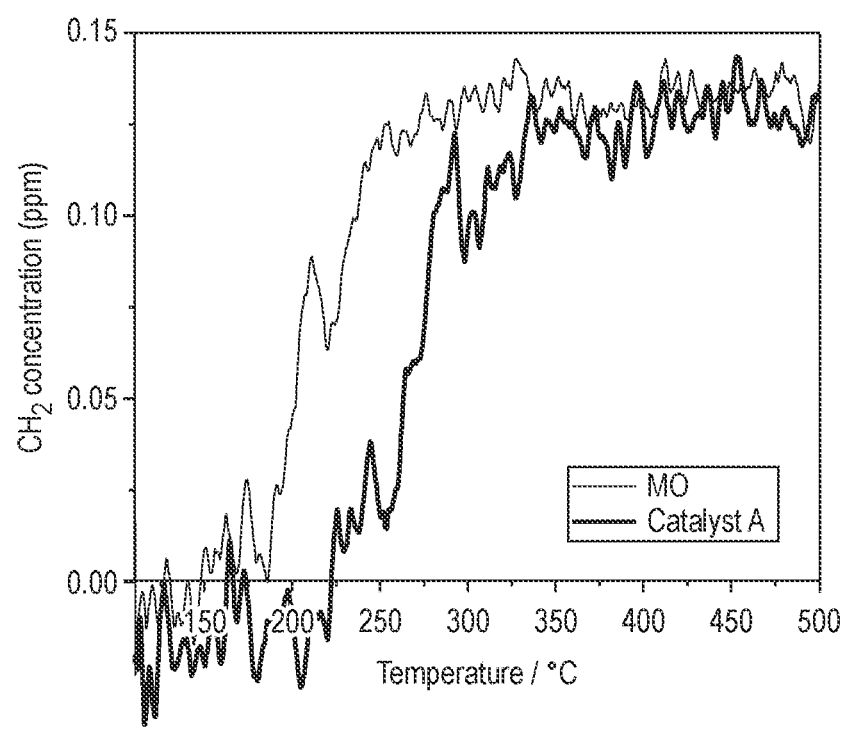

FIGS. 3A and 3B provide the results of Example 3 and plot the conversion of methanol and CO, respectively, against temperature under VOC testing conditions for Catalyst MO together with Catalyst A. FIGS. 3C and 3D plot the observed concentrations of formaldehyde and CO2, respectively, against temperature for both Catalyst MO and Catalyst A.

Figure 4A:
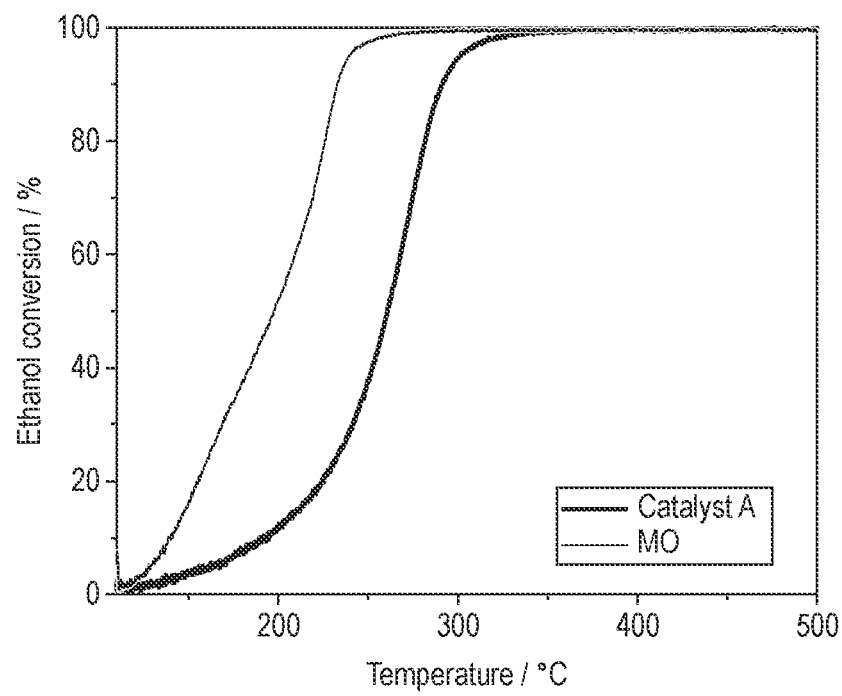
Figure 4B:
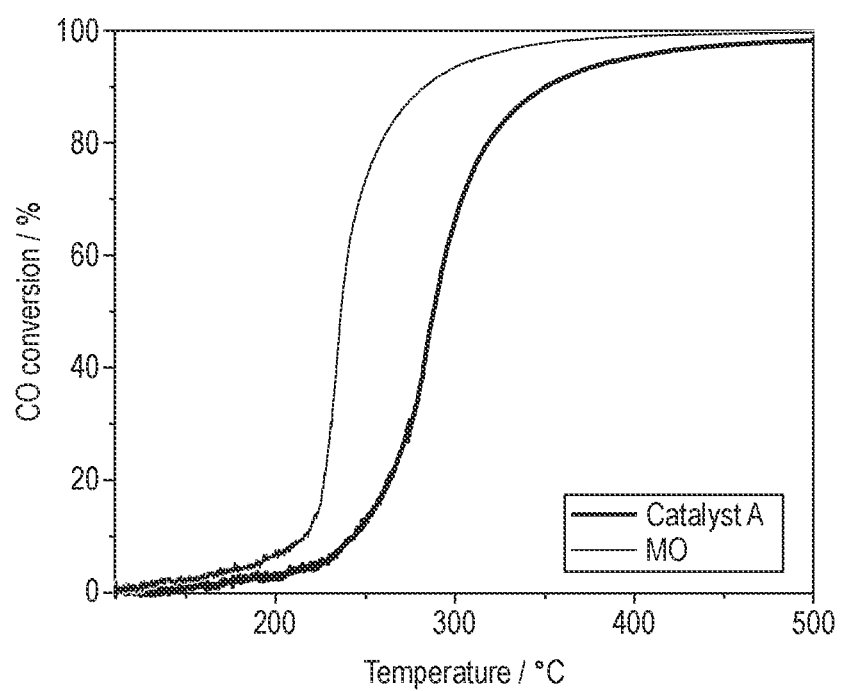
Figure 4C:
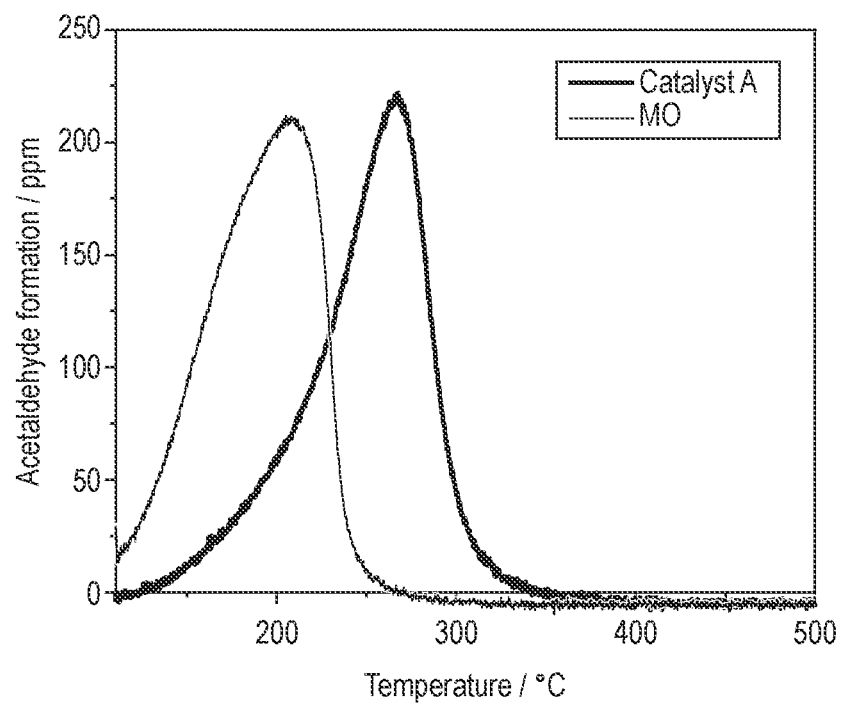
Figure 4D:
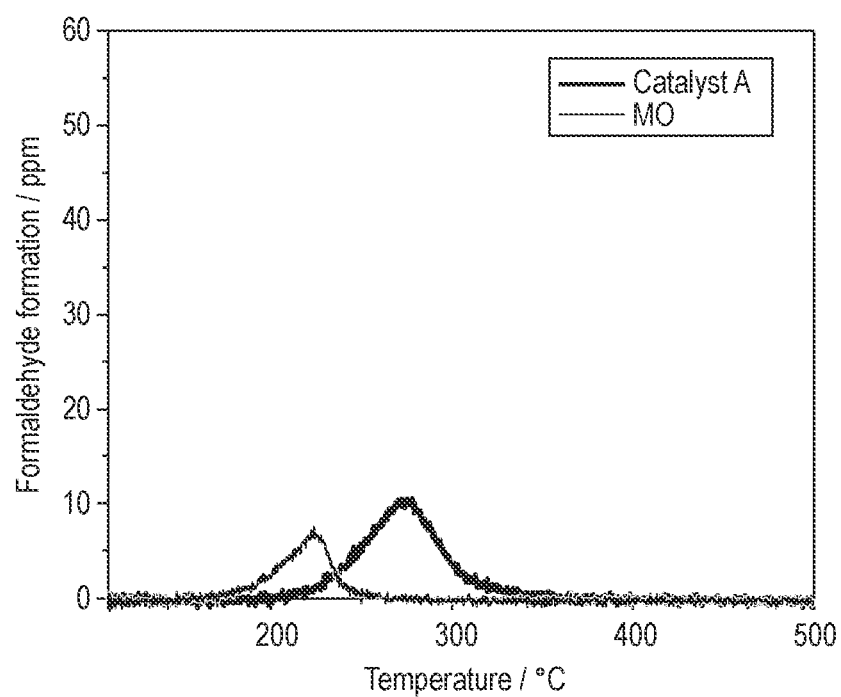

FIGS. 4A and 4B provide the results of Example 4 and plot the conversion of ethanol and CO, respectively, against temperature under VOC testing conditions for Catalyst MO together with Catalyst A. FIGS. 4C and 4D plot the observed concentrations of acetaldehyde and formaldehyde, respectively, against temperature for both Catalyst MO and Catalyst A.

Figure 5A:
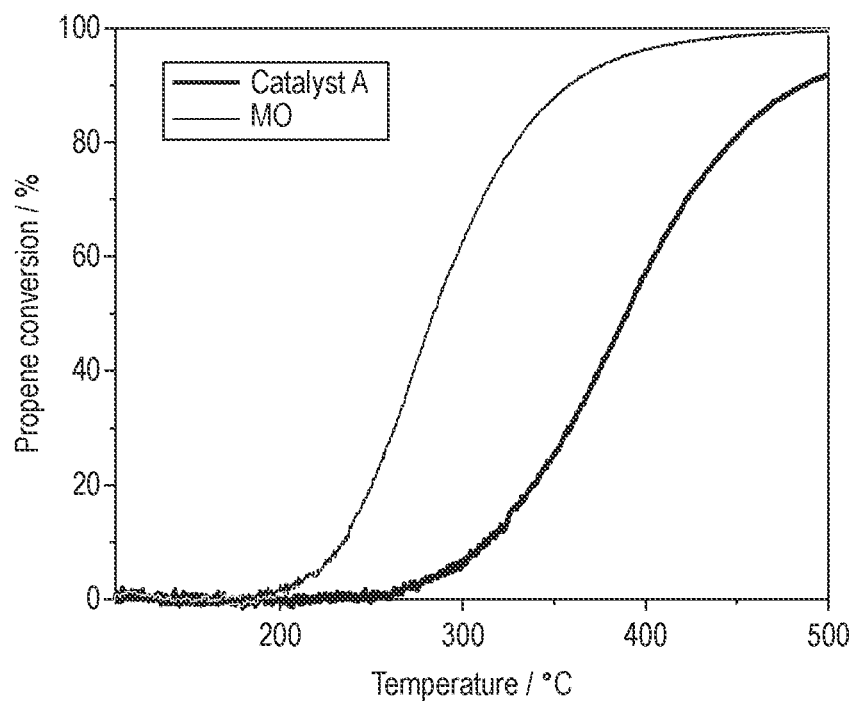
Figure 5B:
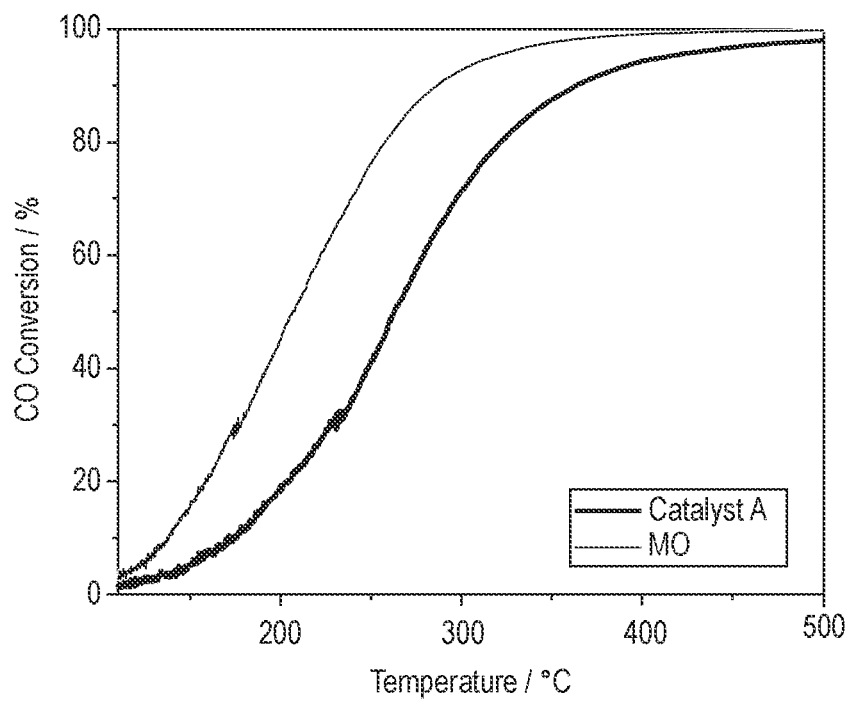

FIGS. 5A and 5B provide the results of Example 5 and plot the conversion of propene and CO, respectively, against temperature under VOC testing conditions for Catalyst MO together with Catalyst A.

Figure 6A:
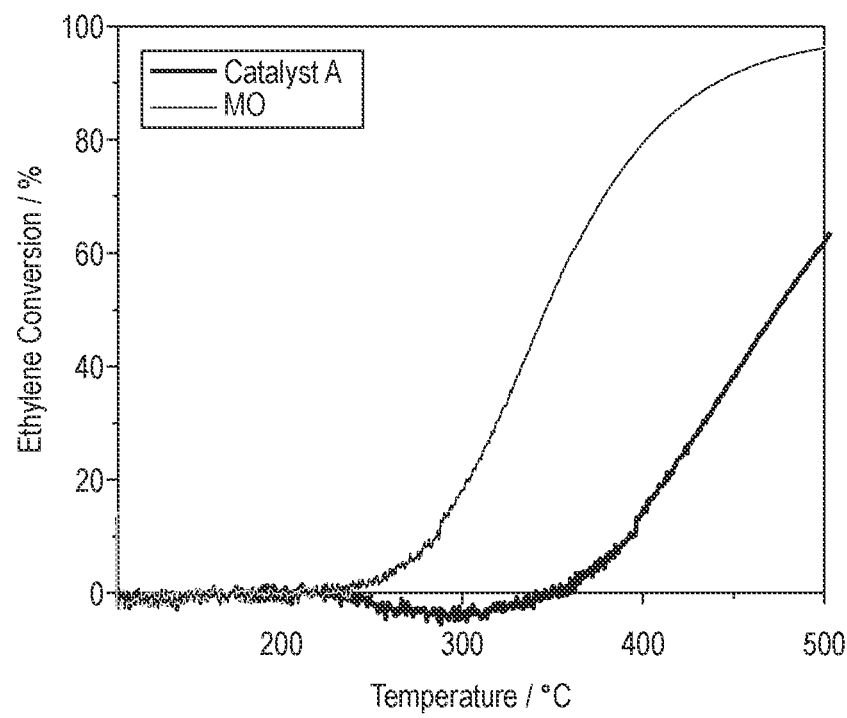
Figure 6B:
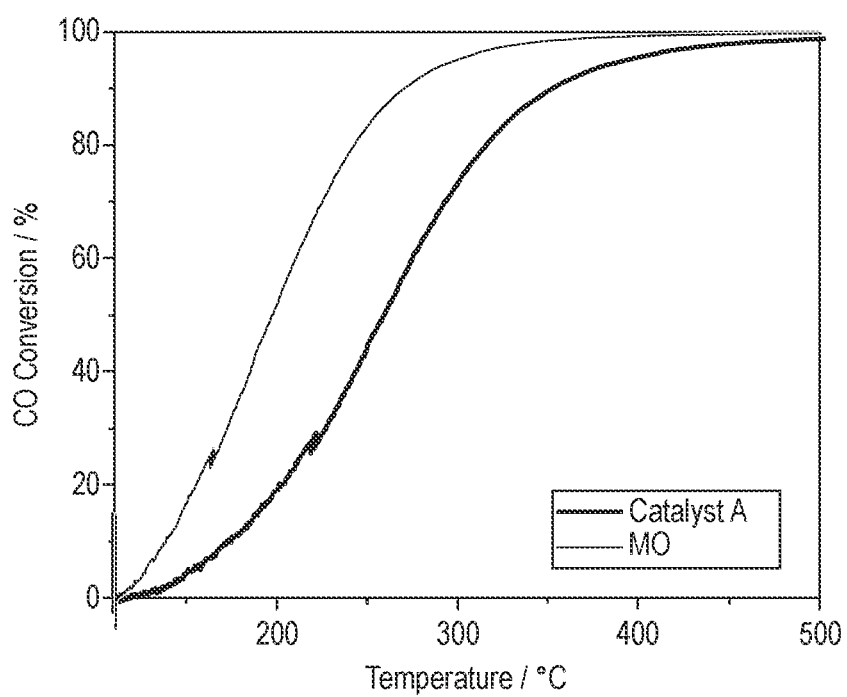

FIGS. 6A and 6B provide the results of Example 6 and plot the conversion of ethylene and CO, respectively, against temperature under VOC testing conditions for Catalyst MO together with Catalyst A.

Figure 7A:
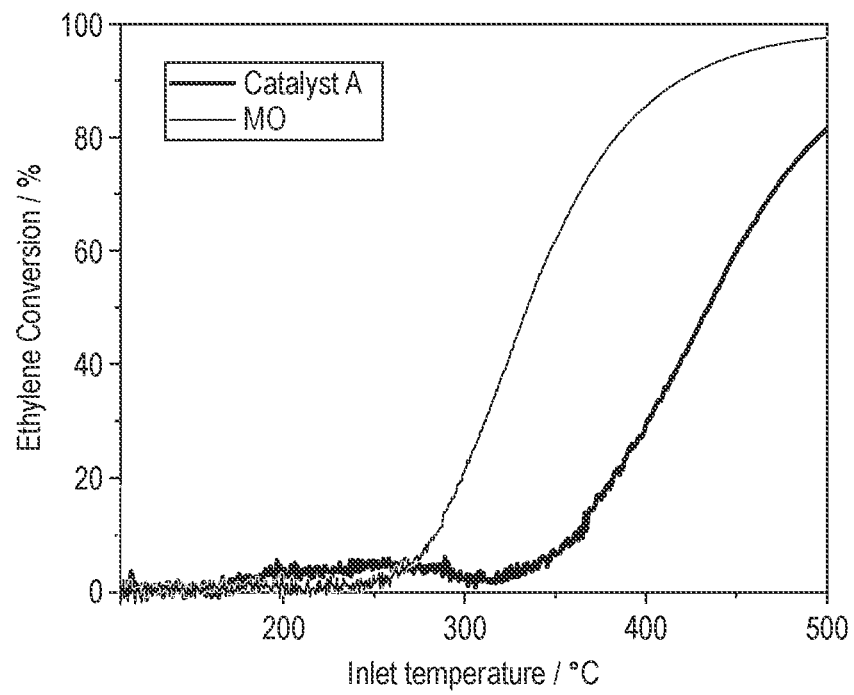
Figure 7B:
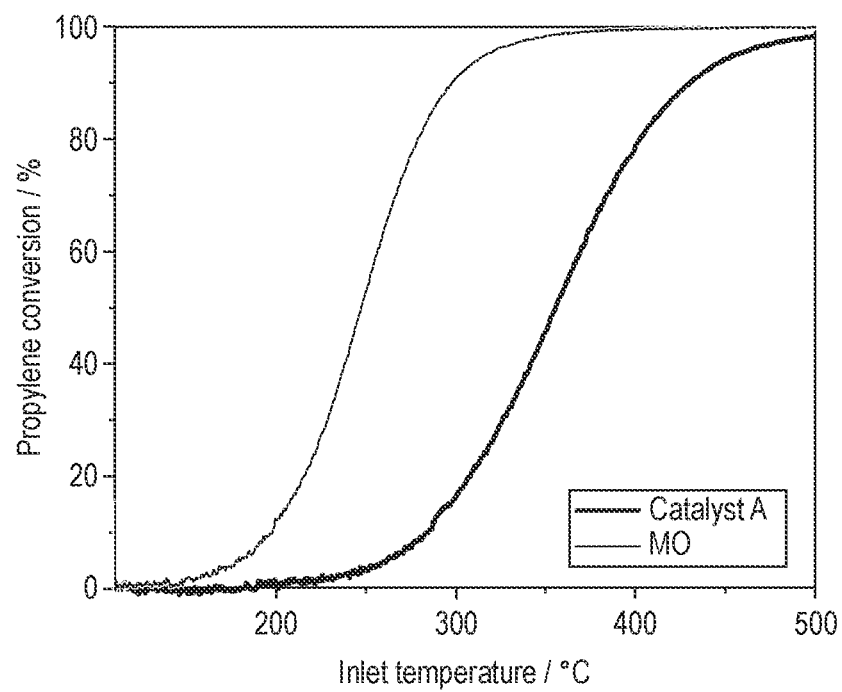
Figure 7C:
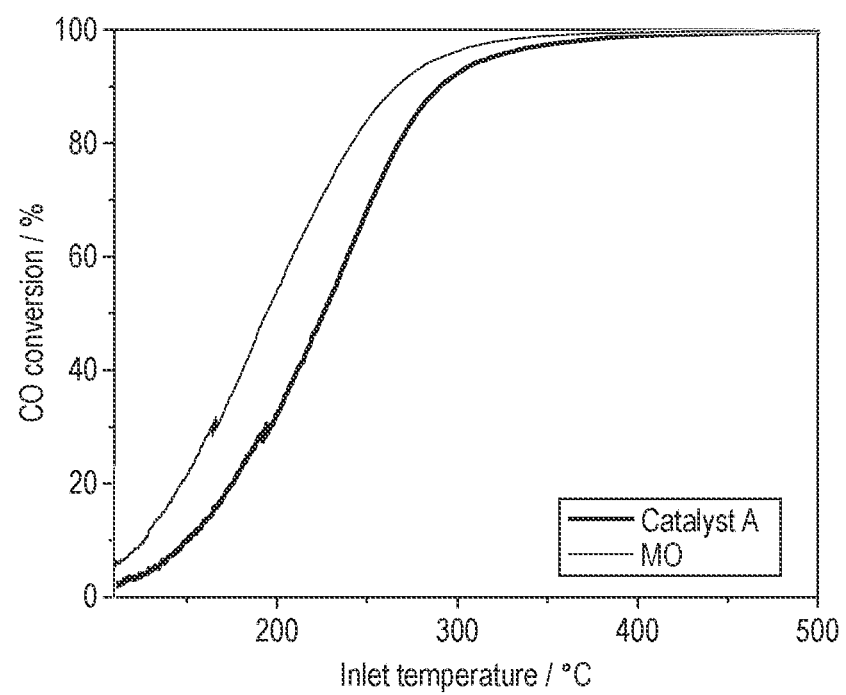

FIGS. 7A, 7B and 7C provide the results of Example 7 and plot the conversion of ethylene, propene and CO, respectively, against temperature under VOC testing conditions for Catalyst MO together with Catalyst A.

EXAMPLES

Preparation of Mixed Metal Oxide

Co-precipitation involves the use of metal nitrates in solution (Mn, Cu, Mg, Al, La). An alkali solution is used as the precipitation agent (NaOH/Na$_2$CO$_3$). The metal nitrate solution is obtained by dissolving the metal nitrate precursors together in one container with demineralised water. For the preparation of the alkali solution, NaOH and Na$_2$CO$_3$ are mixed together and demineralised water is added. Both solutions are stirred and then transferred from their containers to the reactor by using liquid pumps.

TABLE 1

| Preparation of alkali solution | |
| --- | --- |
| Alkali | Target mass (Kg) |
| NaOH | 3.36 (2.8M) |
| Na$_2$CO$_3$ | 4.77 (1.5M) |
| Water for alkali solution | Target volume = 30 L |

TABLE 2

| Preparation of metal nitrate solution | |
| --- | --- |
| Metal Nitrate | Target mass (Kg) |
| Manganese (II) Nitrate solution | 9.85 kg solution (4.92 kg Mn nitrate + 4.92 kg H$_2$O) (27.45 mol) |
| Copper (II) Nitrate hemi(pentahydrate) | 0.87 (3.74 mol) |
| Lanthanum (III) Nitrate Hexahydrate | 4.33 (9.9998 mol) |
| Magnesium Nitrate Hexahydrate | 1.6 (6.24 mol) |
| Aluminium Nitrate Nonahydrate | 0.94 (2.5 mol) |
| Water for nitrates solution | Target volume = 20 L 4.92 L from Mn solution, need to add about 15 L demineralised H$_2$O |

The co-precipitation was carried out by adding both solutions from Tables 1 and 2 at a controlled addition rate, with stirring, that allows to keep a pH constant at about 10-11. pH may be monitored using a standard pH electrode.

The addition may be carried out over a period of about 1 hour and the reaction mixture stirred for another hour after complete addition.

Once the co-precipitation has finished it is necessary to wash and filter. Large amounts of demineralised water is flushed through the precipitant until the conductivity of the water is that of the fresh demineralised water (e.g. about 100 µS).

Finally, the solid material is dried overnight at 105-110° C. in air overnight before grinding followed by calcination at, for example, 500° C. in air for 2 hours. The resulting mixed metal oxide may be referred to herein as Catalyst MO.

Testing of Mixed Metal Oxide

The mixed metal oxide was tested against a comparative known commercial PGM-free base metal catalyst, Catalyst A.

Catalyst A is prepared in accordance with WO 2010/123731 and comprises a support comprising a lanthanum stabilised alumina and cerium stabilised zirconia. Manganese is added as an acetate to the washcoat slurry which is applied to a ceramic substrate in two passes to provide a target washcoat loading of 3.3 g/in3 (0.2 g/cm3). Copper nitrate is then impregnated targeting 375 g/ft3 (13,243 g/m3). As determined by ICP, Catalyst A comprises 3 wt % Mn and 2 wt % Cu on a metal-only basis.

The Catalyst A core was crushed, pelletised, ground and sieved. Sieve fractions of 355-250 um were used for testing. A total of 0.2 g of sieved material was tested.

The mixed oxide is powder, therefore, it did not need crushing. The sample was also pelletised, ground and sieved before testing.

Example 1 (Formaldehyde and Methanol Activity)

Gas Engine Test Conditions: 100 ppm CH4, 20 ppm CH2O, 200 ppm NOx, 540 ppm CO, 10% O2, 10% CO2, 10% H2O, Balance N2; 0.2 g catalyst (355-250 µm), Flow=3.3 L/min, T ramp=110-500° C.

The results are shown in FIGS. 1A and 1B. The mixed metal oxide (i.e. Catalyst MO) achieves a 50% formaldehyde conversion at 175° C. whereas Catalyst A achieves 50% formaldehyde conversion at 220° C. Similarly, the mixed metal oxide achieves 50% methanol conversion at the lower temperature of 211° C. when compared to 270° C. as required by Catalyst A.

Example 2 (CO and NO Activity)

Gas Engine Test Conditions: 100 ppm CH4, 20 ppm CH2O, 200 ppm NOx, 540 ppm CO, 10% O2, 10% CO2, 10% H2O, Balance N2; 0.2 g catalyst (355-250 μm), Flow=3.3 L/min, T ramp=110-500° C.

The results are shown in FIGS. 2A and 2B. The mixed metal oxide (i.e. Catalyst MO) achieves a 50% CO conversion at 243° C. whereas Catalyst A achieves 50% CO conversion at 272° C. Similarly, the start temperature for NO conversion for the mixed metal oxide is about 225° C. whereas that of Catalyst A is about 300° C.

Example 3 (Methanol and CO Oxidation)

VOC Test Conditions: 500 ppm methanol, 1000 ppm CO, 15% $O_2$, 5% $H_2O$, Balance $N_2$; 0.2 g catalyst (355-250 μm), Flow=3.3 L/min, T ramp=110-500° C.

The results are shown in FIGS. 3A and 3B. The mixed metal oxide (i.e. Catalyst MO) achieves a 50% methanol conversion at 191° C. whereas Catalyst A achieves 50% methanol conversion at 260° C. Similarly, the mixed metal oxide achieves 50% CO conversion at the lower temperature of 222° C. when compared to 275° C. as required by Catalyst A.

Additionally, as seen in FIGS. 3C and 3D, the mixed metal oxide shows greater selectivity to producing $CO_2$ resulting in a reduction in the amount of formaldehyde produced.

Example 4 (Ethanol and CO Oxidation)

VOC Test Conditions: 500 ppm ethanol, 1000 ppm CO, 15% $O_2$, 5% $H_2O$, Balance $N_2$; 0.2 g catalyst (355-250 μm), Flow=3.3 L/min, T ramp=110-500° C.

The results are shown in FIGS. 4A and 4B. The mixed metal oxide (i.e. Catalyst MO) achieves a 50% ethanol conversion at 198° C. whereas Catalyst A achieves 50% ethanol conversion at 261° C. Similarly, the mixed metal oxide achieves 50% CO conversion at the lower temperature of 236° C. when compared to 288° C. as required by Catalyst A.

Additionally, as seen in FIGS. 4C and 4D, the mixed metal oxide produces less formaldehyde than Catalyst A.

Example 5 (Propene and CO Oxidation)

VOC Test Conditions: 500 ppm propene, 1000 ppm CO, 15% O2, 5% H2O, Balance N2; 0.2 g catalyst (355-250 μm), Flow=3.3 L/min, T ramp=110-500° C.

The results are shown in FIGS. 5A and 5B. The mixed metal oxide (i.e. Catalyst MO) achieves a 50% propene conversion at 284° C. whereas Catalyst A achieves 50% propene conversion at a significantly higher temperature of 390° C. Similarly, the mixed metal oxide achieves 50% CO conversion at the lower temperature of 207° C. when compared to 262° C. as required by Catalyst A.

Example 6 (Ethylene and CO Oxidation)

VOC Test Conditions: 500 ppm ethylene, 1000 ppm CO, 15% $O_2$, 5% $H_2O$, Balance $N_2$; 0.2 g catalyst (355-250 μm), Flow=3.3 L/min, T ramp=110-500° C.

The results are shown in FIGS. 6A and 6B. The mixed metal oxide (i.e. Catalyst MO) achieves a 50% ethylene conversion at 346° C. whereas Catalyst A achieves 50% ethylene conversion at a significantly higher temperature of 475° C. Similarly, the mixed metal oxide achieves 50% CO conversion at the lower temperature of 196° C. when compared to 259° C. as required by Catalyst A.

Example 7 (Propylene, Ethylene and CO Oxidation)

VOC Test Conditions: 500 ppm propene, 500 ppm ethylene, 1000 ppm CO, 15% O2, 5% H2O, Balance N2; 0.2 g catalyst (355-250 μm), Flow=3.3 L/min, T ramp=110-500° C.

The results are shown in FIGS. 7A-7C. The mixed metal oxide (i.e. Catalyst MO) achieves a 50% ethylene conversion at 335° C. and a 50% propene conversion at 247° C. whereas Catalyst A achieves 50% ethylene and propene conversion at significantly higher temperatures of 435° C. and 355° C., respectively. Similarly, the mixed metal oxide achieves 50% CO conversion at the lower temperature of 195° C. when compared to 226° C. as required by Catalyst A.

As used herein, the singular form of "a", "an" and "the" include plural references unless the context clearly dictates otherwise. The use of the term "comprising" is intended to be interpreted as including such features but not excluding other features and is also intended to include the option of the features necessarily being limited to those described. In other words, the term also includes the limitations of "consisting essentially of" (intended to mean that specific further components can be present provided they do not materially affect the essential characteristic of the described feature) and "consisting of" (intended to mean that no other feature may be included such that if the components were expressed as percentages by their proportions, these would add up to 100%, whilst accounting for any unavoidable impurities), unless the context clearly dictates otherwise.

The foregoing detailed description has been provided by way of explanation and illustration, and is not intended to limit the scope of the appended claims. Many variations of the presently preferred embodiments illustrated herein will be apparent to one of ordinary skill in the art, and remain within the scope of the appended claims and their equivalents.

The invention claimed is:

1. A method for the treatment of an exhaust gas comprising carbon monoxide (CO) and/or one or more volatile organic compounds (VOCs), the method comprising, contacting the exhaust gas with a PGM-free catalyst article comprising a mixed oxide of Mn, Cu, Mg, Al and La.

2. The method according to claim 1, wherein the mixed oxide comprises 40 to 50 wt % Mn and at least 5 wt % Cu, on a metal-only basis.

3. The method according to claim 1, wherein the mixed oxide comprises, on a metal-only basis:
   40 to 50 wt % Mn;
   6 to 8 wt % Cu;
   3 to 6 wt % Mg;
   1 to 3 wt % Al;
   35 to 45 wt % La.

4. The method according to claim 3, wherein the mixed oxide consists essentially of Mn, Cu, Mg, Al, La, and oxygen.

5. The method according to claim 1, wherein the mixed oxide comprises, on a metal-only basis:
   42 to 48 wt % Mn;
   about 7 wt % Cu;
   about 4.5 wt % Mg;
   about 2 wt % Al; and
   39 to 43 wt % La.

6. The method according to claim 1, wherein a molar ratio of Mn to La is from 2.5:1 to 3:1.

7. The method according to claim 1, wherein the VOCs comprise one or more compounds selected from the group consisting of methanol, ethanol, acetaldehyde, formaldehyde, propene and ethylene.

8. The method according to claim 1, wherein the exhaust gas is from an HVAC system or is a tail-gas from a chemical synthesis process.

9. The method according to claim 1, wherein the exhaust gas is from a terephthalic acid synthesis process.

10. An HVAC system comprising a PGM-free catalyst article comprising a mixed oxide of Mn, Cu, Mg, Al and La.

11. An HVAC system of claim 10, wherein the mixed oxide comprises, on a metal-only basis:
    40 to 50 wt % Mn;
    6 to 8 wt % Cu;
    3 to 6 wt % Mg;
    1 to 3 wt % Al; and
    35 to 45 wt % La.

\* \* \* \* \*